US 6,627,123 B2

(12) United States Patent
Boorom et al.

(10) Patent No.: US 6,627,123 B2
(45) Date of Patent: Sep. 30, 2003

(54) METHOD FOR SELECTIVELY PLUGGING A HONEYCOMB

(75) Inventors: James A. Boorom, Coopers Plains, NY (US); Robert J. Paisley, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/086,778

(22) Filed: Feb. 28, 2002

(65) Prior Publication Data

US 2003/0160364 A1 Aug. 28, 2003

(51) Int. Cl.[7] .............................................. B29C 39/10
(52) U.S. Cl. ...................... 260/460; 264/482; 264/254; 264/267; 264/DIG. 48
(58) Field of Search ................... 264/267, 254, 264/345, DIG. 48, 460, 482, 37.29, 40.1

(56) References Cited

U.S. PATENT DOCUMENTS

| | | | |
|---|---|---|---|
| 4,293,357 A | | 10/1981 | Higuchi et al. |
| 4,297,140 A | | 10/1981 | Paisley |
| 4,399,230 A | * | 8/1983 | Kaltenbach et al. .......... 501/20 |
| 4,411,856 A | | 10/1983 | Montierth |
| 4,428,758 A | * | 1/1984 | Montierth .................... 55/523 |
| 4,432,918 A | * | 2/1984 | Paisley ........................ 264/43 |
| 4,557,773 A | | 12/1985 | Bonzo |
| 4,559,193 A | | 12/1985 | Ogawa et al. |
| 5,021,204 A | | 6/1991 | Frost et al. |
| 5,364,573 A | | 11/1994 | Noky |
| 5,433,904 A | | 7/1995 | Noky |
| 5,639,070 A | * | 6/1997 | Deckard ..................... 264/497 |
| 6,180,914 B1 | | 1/2001 | Jones et al. |
| 6,292,584 B1 | | 9/2001 | Dulaney et al. |
| 2002/0020944 A1 | | 2/2002 | Yamaguchi et al. |

* cited by examiner

Primary Examiner—Mark Eashoo
Assistant Examiner—Edmund H. Lee
(74) Attorney, Agent, or Firm—Anca C. Gheorghiu

(57) ABSTRACT

A method for plugging a selected subset of cell channels of a honeycomb structure having a multiplicity of mutually adjoining cell channels which have open ends at and extend throughout the structure between opposing end faces thereof. The method includes (a) loading a powdered plugging material into open end portions of cell channels at one end face of the honeycomb structure, wherein the powdered plugging material passes the length of the cell channels to settle at opposing end portions of the cell channels; (b) compacting the powdered plugging material in the cell channels at the one end face of the honeycomb structure; (c) scanning the one end face of the honeycomb structure to locate the selected subset of cell channels to be plugged; (d) generating in response to the scanning step first signals indicating the location of the selected subset of cell channels; (e) generating in response to the first signals second signals for positioning a laser with respect to the selected subset of cell channels; (f) positioning the laser with respect to the selected subset of cell channels, wherein the laser generates energy which adherently bonds the compacted plugging material to surrounding cell walls to form plugs thereat; and, (g) removing the remaining compacted plugging material from all but the selected subset of cell channels which have been plugged.

5 Claims, 6 Drawing Sheets

METHOD FOR SELECTIVELY PLUGGING A HONEYCOMB

BACKGROUND OF THE INVENTION

The present invention relates to selectively plugged honeycomb structures, and in particular, to a method and apparatus for use in selectively plugging cells of a honeycomb structure for the fabrication of filter bodies.

Honeycomb structures having transverse cross-sectional cellular densities ranging between 10 and 300 cells/in$^2$ (about 1.5 to 46.5 cells/cm$^2$), more typically between about 100 and 200 cells/in$^2$ (about 15.5 to 31 cells/cm$^2$) and wall thicknesses of between 0.010 and 0.030 in. (about 0.25 to 0.76 mm), especially when formed from ceramic materials are used as solid particulate filter bodies, and require selected cell channels of the structure to be closed or plugged at one or both of their ends.

It is well known that a solid particulate filter body, such as a diesel particulate filter, may be formed by a matrix of intersecting, thin, porous walls which extend across and between two of its opposing end faces and form a large number of adjoining hollow passages or cell channels which also extend between and are open at the end faces of the structure. To form a filter, one end of each of the cell channels is closed, a first subset of cell channels being closed at one end face and the remaining cell channels being closed at the remaining opposing end face of the structure. Either of the end faces may be used as the inlet face of the resulting filter. The contaminated fluid is brought under pressure to the inlet face and enters the body via those cells which have an open end at the inlet face. Because these cell channels are closed at the outlet end face of the body, the contaminated fluid is forced through the thin, porous walls into adjoining cells which are sealed at the inlet face and open at the outlet face of the filter body. The solid particulate contaminant in the fluid which is too large to pass through the porous openings in the walls is left behind and a cleansed fluid exits the filter body through the outlet cell channels, for use.

Up to this time selected cells were sealed or plugged with a foam-type cement, as disclosed in U.S. Pat. Nos. 4,297,140, 4,293,357 and 4,559,193. The cement is formed into a paste by mixing ceramic raw material with an aqueous binder, such as methyl cellulose, plasticizer and water. When using this foam-type cement, both ends of the honeycomb structure are covered with flexible masks having holes through which the cement is pushed into the ends of the cells. There are numerous disadvantages associated with this type of filling or plugging material. Masks are applied manually to the honeycomb ends, must be cleaned and dried after each use. Unclean masks can cause missing plugs requiring additional manual labor. The cement batch is time, shear and temperature dependent; often thrown out, unused due to age restrictions; and, drying is required to remove the water content.

SUMMARY OF THE INVENTION

The process of the invention is provided to overcome the disadvantages of prior art plugging methods. The process is for plugging with a powdered plugging material, a selected subset of cell channels of a ceramic honeycomb structure having a multiplicity of mutually adjoining cell channels which have open ends at and extend throughout the structure between opposing end faces. "Powdered plugging material" as used in the description of the present invention means a material which is formed of particulates. This type of plugging material is in contrast to current prior art plugging materials which are a cement, having a wet, paste-like consistency. Although any powdered plugging material suitable for forming plugs may be used in the present invention, the preferred material comprises particulate sealant as described and claimed in co-pending patent application filed concurrently with the present application in the names of by M. Fabian, S. Lakhwani, and M. Roberts under the title PARTICULATE SEALANT FOR FILTER PLUG FORMING.

In practice, powdered plugging material is loaded through the open end portions of all the cell channels at one end face of the honeycomb structure and passes through the structure settling at the opposing cell end portions. Next, the powdered plugging material is compacted by suitable compaction means, such as vibration, centrifuge, manual compaction and the like. An optical image analyzer, which includes a camera, is used to scan and locate a selected subset of cell channels which are to be plugged. In response thereto, a first set of signals is generated indicating the location the subset of selected cell channels, the signals being inputted to a microprocessor. A second set of signals is then generated by the processor to position a laser with respect to the selected subset of cell channels, whereby the laser system applies laser energy to the powdered plugging material to form plugs. In the application of laser energy, the powdered plugging material is heated sufficiently to become flowable, adhering to the cell walls. Upon cooling the material re-solidifies and a plug is formed at the end portions of the selected cell channels. The remaining plugging material which has not been exposed to the laser energy is easily uncompacted and then removed from honeycomb structure. The so-plugged honeycomb structure is fired to sinter the plugs and form the desired final structure.

In one embodiment, a solid particulate filter is fabricated by forming plugs in a first subset of cell channels of a honeycomb structure at one of its end faces; removing the plugging material in a remaining second subset of cell channels by uncompacting the plugging material from the end portions thereat; and, reusing the uncompacted plugging material to form plugs at the remaining end portion of the second subset of cell channels. Therein results a honeycomb structure having all of the cell channels plugged at only one end portion, preferably in an alternate checkered pattern.

In a second embodiment, a solid particulate filter body is formed by forming plugs in a first subset of selected cell channels of a honeycomb structure at one of its end faces; removing the plugging material in the remaining second subset of cell channels; loading a new batch of plugging material into the honeycomb structure through the open ends of the second subset of cell channels at the plugged end face; passing plugging material thorough the second set of cell channels to the opposing end portions, where it is compacted and exposed to laser energy to form adherently bonded plugs. Therein results a honeycomb structure having all of the cell channels plugged at only one end portion, preferably in an alternate checkered pattern.

BRIEF DESCRIPTION OF THE DRAWINGS

The various aspects of the present invention may be more clearly understood with reference to the accompanying figures in which.

DETAILED DESCRIPTION OF THE INVENTION

Figure 1:
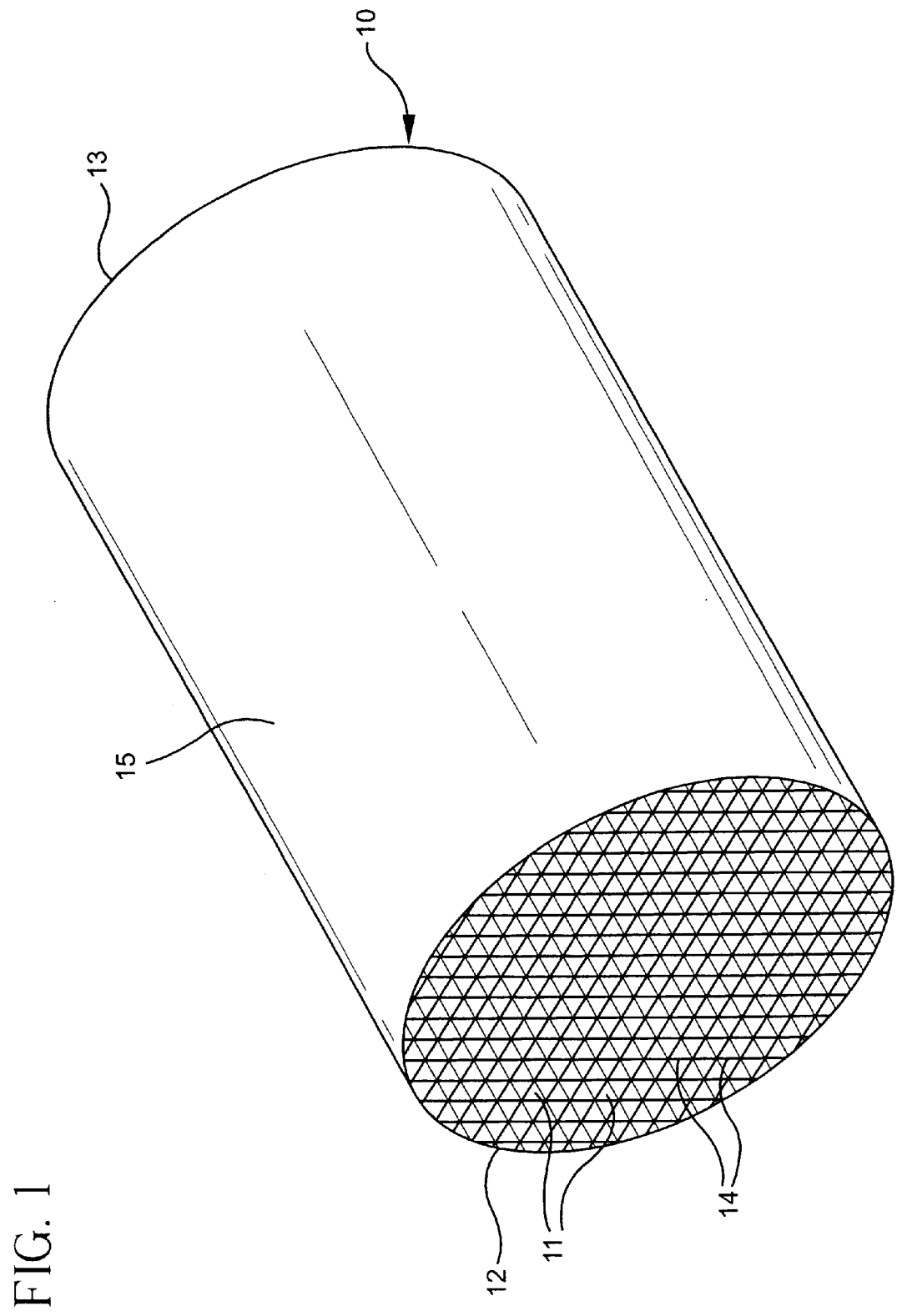
FIG. 1 is an exemplary honeycomb structure of the type used in the fabrication of solid particulate filters with the inventive method.

One significant use of the present invention is in the fabrication of solid particulate filters, such as for diesel exhaust filtration. The practice of the inventive method in the fabrication of such filter bodies is now described with reference to FIGS. 1 through 4.

All of the accompanying figures depict an exemplary honeycomb structure 10 used in the fabrication of the filter bodies according the present invention. The structure 10, isolated in FIG. 1, comprises a multiplicity of hollow cell channels 11 which extend in a substantially mutually parallel fashion through the structure between opposing, circular end faces 12 and 13. The end faces 12 and 13 typically are substantially square to the central longitudinal axes of the cell channels 11 formed by walls 14 extending between the end faces 12 and 13. For solid particulate filter body fabrication, the walls 14 are porous and intersect with one another to form a continuous matrix across and between the end faces 12 and 13. The walls 14 are also preferably uniformly thin, although walls of non-uniform thickness may also be used with less efficiency. A somewhat thicker outer covering or skin 15, typically formed from the same material used in the thin walls, may be provided around the cell channels 11 between the end faces 12 and 13. Although the depicted cell channels have been provided with substantially square transverse cross-sectional geometries, other shapes such as circles, ellipses and triangles may be substituted.

Honeycomb structures for solid particulate filter bodies and other applications may be formed of a variety of materials including ceramics, glass-ceramics, glasses, metals, and by a variety of methods depending upon the material selected. Honeycomb structures having the necessary uniformly thin, porous and interconnected walls for solid particulate filtering applications are preferably fabricated from plastically formable and sinterable finely divided particles of substances that yield a porous, sintered material after being fired to affect their sintering. Suitable materials include metallics, ceramics, glass-ceramics, and other ceramic based mixtures. A method of forming such a ceramic honeycomb monolith from an extruded cordierite material which is preferred in solid particulate filtering applications is described in co-pending, co-assigned patent application having Serial Number (Robust Cordierite Application). Suitable compositions are provided therein.

Figure 2B:
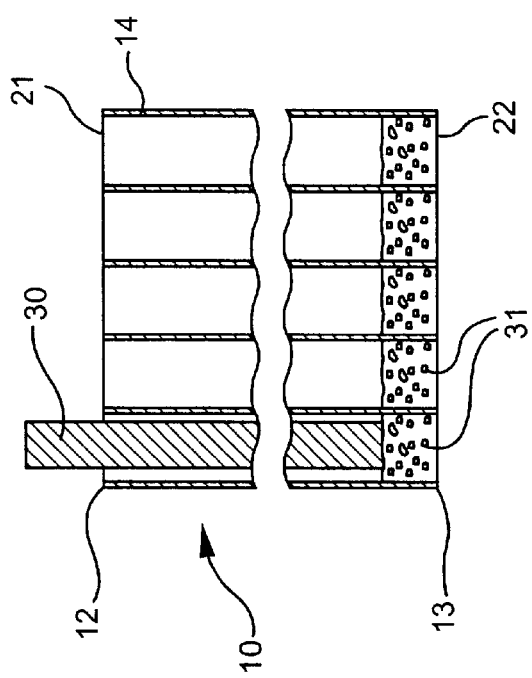
FIGS. 2a–d illustrates the process steps of an embodiment of the present invention.
Figure 2A:
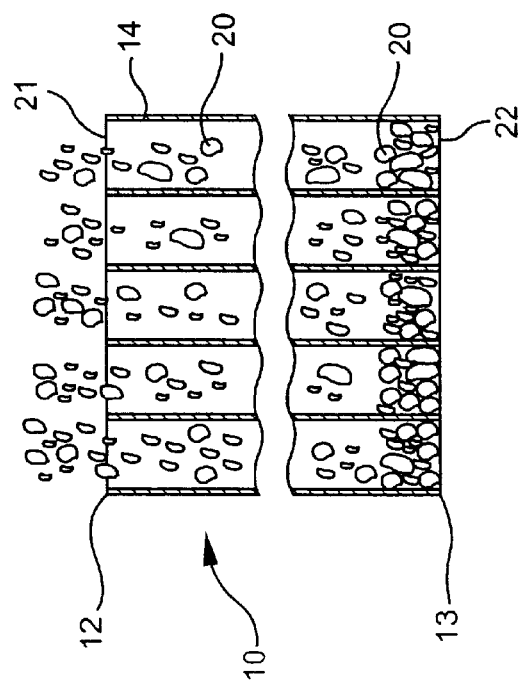

Reference will now be made to FIGS. 2a-d which illustrates the steps of the process of forming a filter body according to the practice of the present invention. Illustrated therethrough is a expanded, sectioned view of a honeycomb structure of FIG. 1. Accordingly, the process starts by loading powdered plugging material 20 through the open end portions 21 of the cell channels 11 at one end face of the honeycomb structure 10. For illustrative purposes end face 12 is being used as the first end face. As shown in FIG. 2a the powdered plugging material 20 is a dry loose powder that passes the length of the cell channels 11 from the open end portion 21 where it is loaded to the remaining, opposing end portion 22.

The powdered plugging material of the present invention comprises particulate sealant as described and claimed in co-pending patent application filed concurrently with the present application in the names of by M. Fabian, S. Lakhwani, and M. Roberts under the title PARTICULATE SEALANT FOR FILTER PLUG FORMING, which is incorporated by reference in its entirety herein. The particulate sealant taught therein has a formulation consisting essentially, by weight, of about 70 to 90% ceramic blend, the ceramic blend being raw ceramic materials selected to form a composition consisting essentially of in percent by weight about 12 to 16% MgO, about 33 to 38% $Al_2O_3$, and about 49 to 54% $SiO_2$, which will form cordierite ($2MgO.2Al_2O_3.5SiO_2$) on firing, and about 10 to 30% non-aqueous binder comprising a polymer selected from the group consisting of high molecular weight thermoplastic polymer and thermosetting resin. The composition of particulate sealant preferred in the practice of the present invention consists essentially of about 78 to 84% ceramic blend, the ceramic blend being raw ceramic materials selected to form a composition consisting essentially of in percent by weight about 12 to 16% MgO, about 33 to 38% $Al_2O_3$, and about 49 to 54% $SiO_2$, which will form cordierite ($2MgO.2Al_2O_3.5SiO_2$) on firing, and about 16 to 28% non-aqueous binder, the binder consisting essentially, by weight, of about 9.5–15.0% low melting wax selected from the group consisting of fatty alcohol, fatty acid, fatty glycol, and fatty glyceride waxes, about 5% tri-block styrene-ethylene/butylene-styrene thermoplastic copolymer, and about 2% dispersant.

The powdered plugging material is charged in an amount to achieve a plug depth of between 0.04 inch 1 mm to 0.60 inch 15.5 mm, and preferably 0.3 inch (7.5 mm) to 0.5 inch (12.7 mm) in the cell channels of the honeycomb structure. How the powdered plugging material is charged or loaded into the cell channels is not important to the present invention and can include any means, such as sifting, pouring and injecting. It is envisioned that the charging process can be automated, for example by using a suitable pressurized air actuated gun whose nozzle can be positioned at the proper cell openings on the end faces so as to inject the powdered plugging material into selected cell channels.

The next step involves forming plugs at selected cell channels. In the process of forming plugs, the powdered plugging material 20 at end portions 22 of cell channels 11 is compacted by any suitable compaction means, including hand or mechanical compaction, vibration or centrifuge. In FIG. 2a, mechanical compaction is illustrated for exemplary purposes. A long rod-like member 30 is inserted into the cell channels 11 for tapping and pressing the powdered plugging material into a mass shown at 31. The mass of compacted plugging material effectively seals the entire end face 13. As compacted, the plugging material is held together just enough to resist flowing to the opposing cell end portion. The rod-like member preferably has the same surface area as the individual cell channels for providing good compaction. Compaction of the plugging material ensures strong dense green and fired plugs that bond to all four cell walls.

Figure 2C:
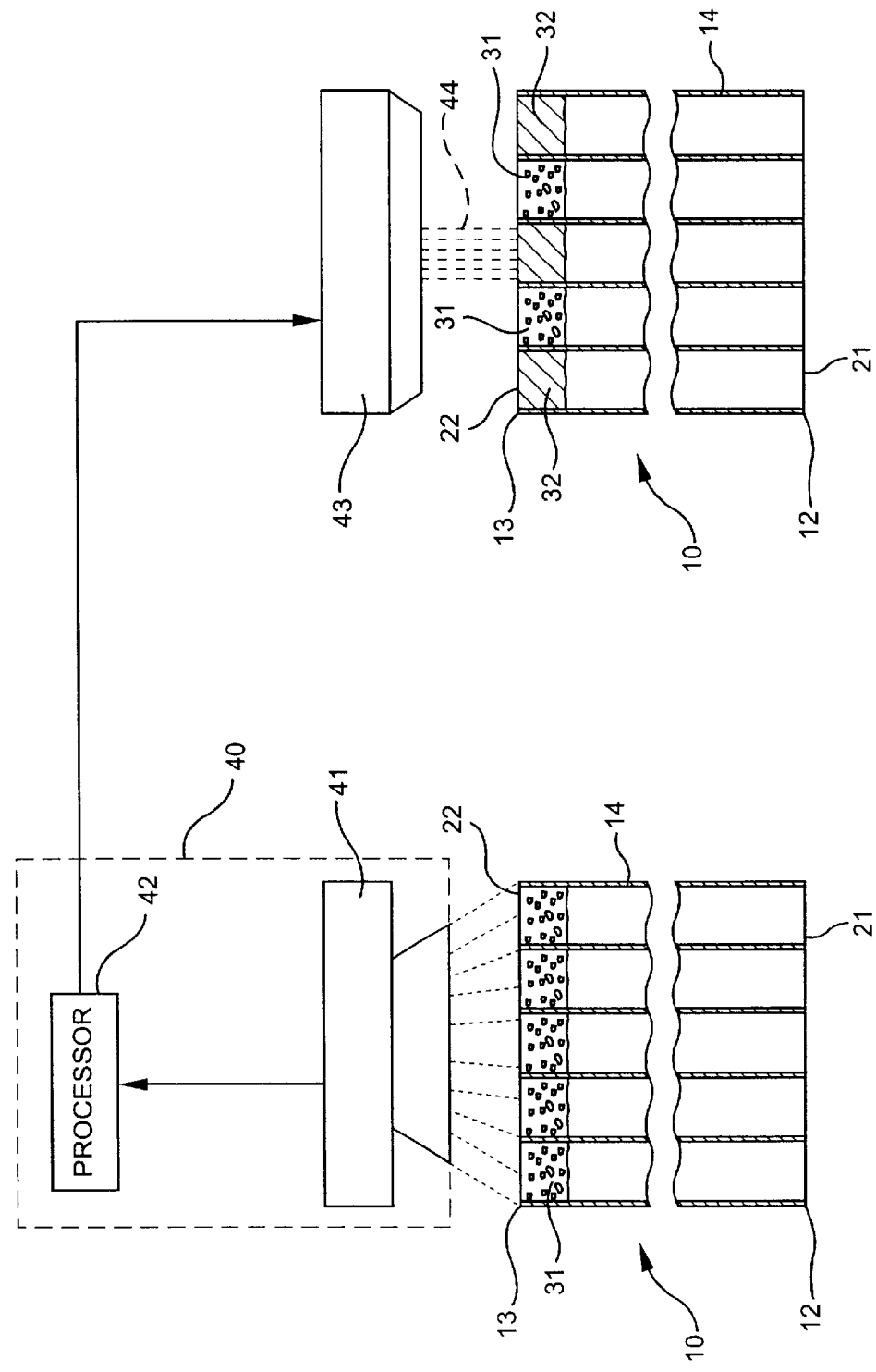

According to the invention only selected cell channels of the honeycomb structure are kept sealed at cell end portions 22 adjacent end face 13 of honeycomb structure 10 by forming plugs thereat. FIG. 2c shows a schematic diagram of a plug forming tool which includes an image analyzer 40 and a laser 43. The laser 43 operates in response to signals generated by the image analyzer 40 which comprises a scanning means 41, such as a television camera or other optical device, and a processor 42, such as a personal computer. Commercially available laser systems may be selected for use, such as those available from Laser Machining, Inc. of Sommerset, Wis. End face 13 with the compacted plugging material in the end portions of cell channels thereat is scanned by camera 41 to locate the pre-selected cell channels at which plugs are to be formed. In response to this scanning step a first set of signals is generated by camera 41 indicating the determined locations. The first set of signals are then carried to the processor 42, which in response to the signals and its own internal programming, generates a second set of signals for positioning and controlling the operation of the laser 43. Laser 43 operates to direct single 44 or multiple beams (not shown) to the selected cell channels, where the energy generated therefrom sufficiently heats the compacted plugging material to become flowable and fuse to the surrounding cell walls. For purposes of illustration the laser beam 44 is directed at alternate cell channels 11, however, other patterns may be provided. After the laser operation, the material cools and re-solidifies forming adherently bonded plugs 32. The operation of the laser is easily determinable by one skilled in the art.

Figure 2D:
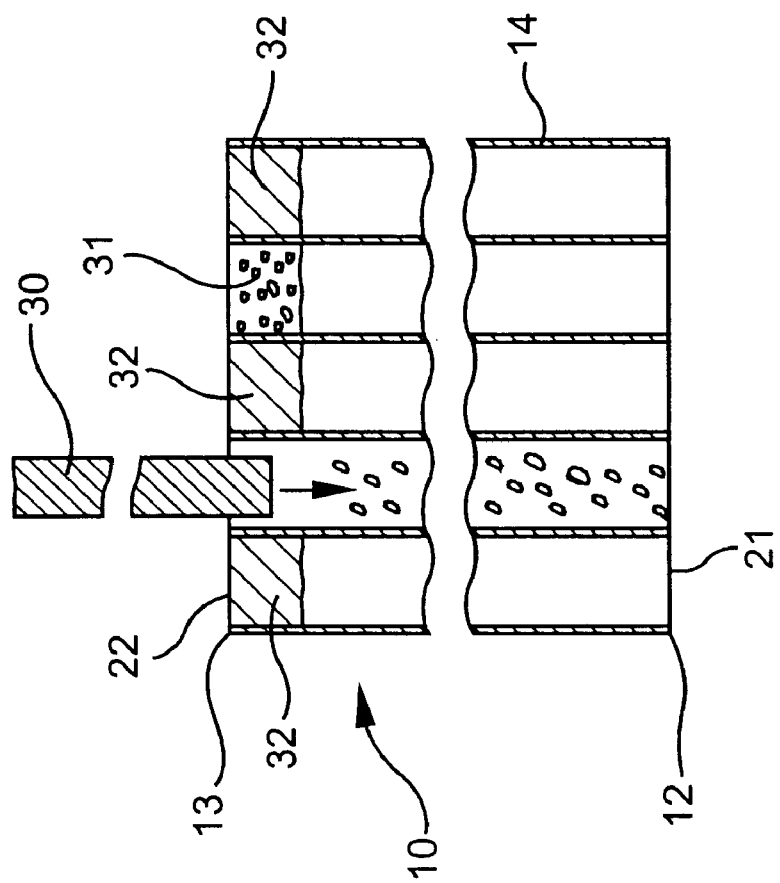

Next, compacted plugging material which has not been exposed to the laser beam energy is uncompacted and removed from the cell ends. Referring now to FIG. 2d, the rod-like member 30 is used once again to break-apart or loosen compacted the compacted plugging material at cell end portion 22 of alternate cell channels 11. The plugging material detaches easily and flows the length of the cell channels to the opposite cell end portions 21 adjacent end face 12. At this point the plugging material can either be evacuated entirely from the honeycomb structure or reused to form plugs at cell end portions 21, as before. If the plugging material is evacuated from the honeycomb structure and a second subset of cell channels need plugging, a new batch of powdered plugging material may be used.

In the fabrication of a solid particulate filter a first subset of cell channels is kept plugged at one end face by first forming plugs at a first subset of cell channels, followed by forming plugs at a second subset of cell channels at the remaining end face. In a preferred embodiment, after a first subset of cell channels is plugged at one end face, the resulting pattern of plugged cells is used as a "mask" to form plugs in a second subset of cell channels at the opposing end face of the honeycomb structure. Preferably, the cell channels are plugged in a checkered pattern reversed between the two end faces. To develop the final structure in the plugs, the sealed or plugged honeycomb is fired or sintered at a temperature of about 1350° C. to 1450° C. for a period of time sufficient to form cordierite, as taught in U.S. Pat. No. 5,258,150.

Figure 3:
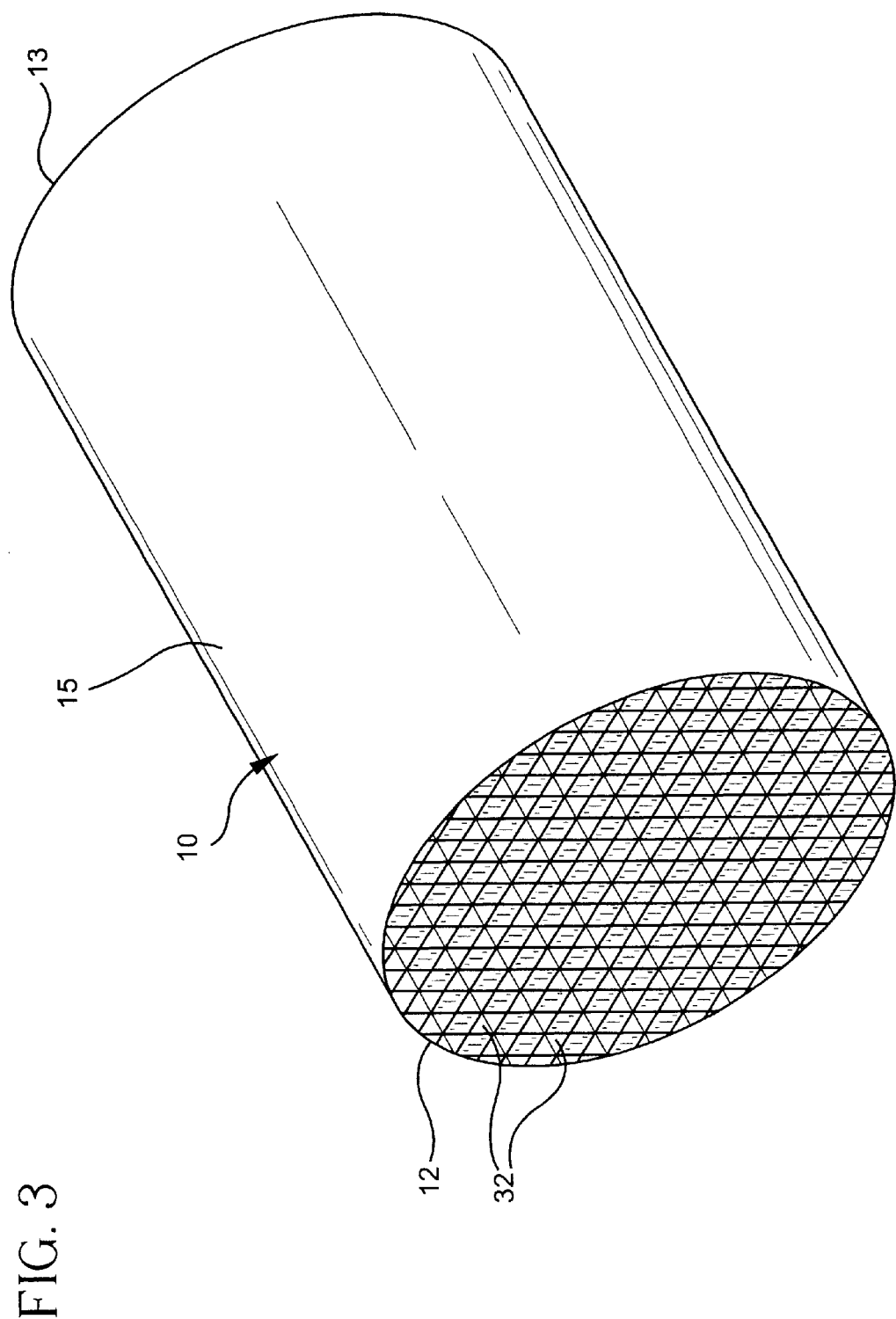
FIG. 3 is perspective view of a solid particulate filter body formed by the process of the present invention; and, FIG. 4 is a sectioned view of a solid particulate filter body showing fluid flow therethrough.
Figure 4:
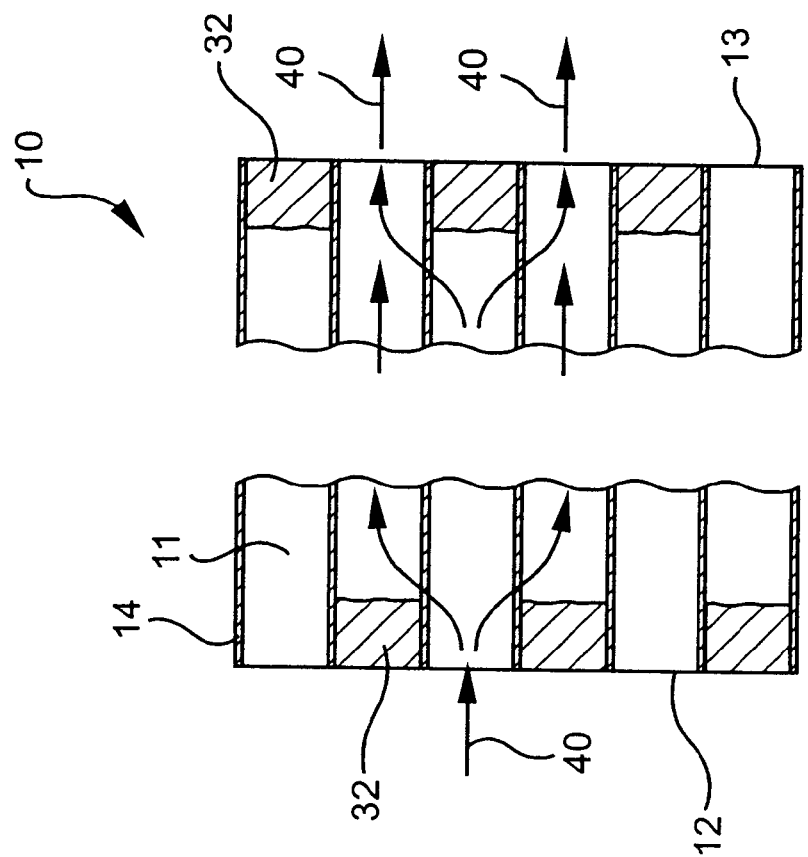

A solid particulate filter body of the type being referred to and fabricated according to the process of the invention is illustrated in FIGS. 3 and 4. FIG. 3 shows a honeycomb structure 10 comprising a plurality of parallel end-plugged cell channels 11 traversing the body from a first or inlet end face 12 to a second, opposing or outlet end face 13. FIG. 4 shows the pattern of fluid flow through the filter body. Fluid flow is indicated by lines 40 with arrows. Thus, fluid 40 passes from first end face 12 into the open cell channels, but because of the blocking effect of plugs 32 at end face 13, the fluid under some pressure than passes through the pores or open porosity in cell walls 14 at the top, bottom and both sides of adjacent cell channels. While fluid 50 passes through the entirety of all cell walls 14, their porosity is such as to restrain particulates therein and thereon as a porous accumulation. The fluid 40 then flows out of open cell channels at the outlet end face 13.

An advantage of the present invention is that the time for plugging or sealing cell channels of honeycomb structures in the fabrication of solid particulate filters is optimized, i.e., minimized, namely by eliminating the use of masks. Other advantages include automatic visual scanning and mapping of the honeycomb structure to accommodate non-uniformity of cell walls and defects; the programming of the laser system can be easily changed to account for different plug patterns; and, higher cell density honeycomb structures can more easily be plugged.

From the foregoing description, one skilled in the art can easily ascertain the essential characteristics of this invention, and without departing from the spirit and scope thereof, can make various changes and modifications of the invention to adapt it to various usages and conditions.

What is claimed:

1. A method for plugging a selected subset of cell channels of a honeycomb structure having a multiplicity of mutually adjoining cell channels which have open ends at and extend throughout the structure between opposing end faces thereof, the method comprising:

a. loading a powdered plugging material into open end portions of cell channels at one end face of the honeycomb structure, wherein the powdered plugging material passes the length of the cell channels to settle at opposing end portions of the cell channels;

b. compacting the powdered plugging material in the end portions of the cell channels at the end face opposite the one end face where the powdered plugging material was loaded;

c. scanning the one end face having the compacted powdered plugging material at the end portions of the cell channels thereat to locate the selected subset of cell channels to be plugged;

d. generating in response to the scanning step first signals indicating the location of the selected subset of cell channels;

e. generating in response to the first signals second signals for positioning a laser with respect to the selected subset of cell channels;

f. positioning the laser with respect to the selected subset of cell channels, wherein the laser generates energy which adherently bonds the compacted plugging material to surrounding cell walls to form plugs in the selected subset of cell channels; and, g. removing the remaining compacted plugging material from all but the selected subset of cell channels which have been plugged.

2. The method according to claim 1 further comprising plugging a second subset of cell channels.

3. The method according to claim 2 wherein both subsets of cell channels are plugged in a checkered pattern, reversed at one end face.

4. A method of fabricating a solid particulate filter, the method comprising:

a. providing a honeycomb structure having a multiplicity of adjoining cell channels extending in a mutually parallel fashion between opposing end faces, the cell channels being formed by a matrix of intersecting porous, thin walls which extend across and between the opposing first and second end faces, the cell channels having open ends at each of the end faces of the honeycomb structure;

b. passing a powdered plugging material through the honeycomb structure from one end portion of each of the multiplicity of cell channels at the first end face to the remaining end portion of the multiplicity of cell channels at the second end face of the honeycomb structure;

c. compacting the powdered plugging material in the cell channels at the second end face of the honeycomb structure;

d. scanning the second end face of the honeycomb structure to locate a first subset of cell channels;

e. generating in response to the scanning step first signals indicating the location of the first subset of cell channels;

f. generating in response to the first signals second signals for positioning a laser with respect to the first subset of cell channels;

g. positioning the laser with respect to the first subset of cell channels whereby the laser system applies energy to form plugs at the first subset of cell channel;

h. removing the remaining compacted plugging material from all but the plugged cell channels, wherein all but the plugged cell channels form a second subset of cell channels; and, i. providing plugs in the second subset of cell channels at first end face.

5. The method of claim 4 wherein the step of providing plugs in the second subset of cell channels comprises reusing the plugging material which has been removed from the first subset of cell channels to form plugs in the second subset of cell channels.

* * * * *